(12) United States Patent
Liu et al.

(10) Patent No.: US 7,949,941 B2
(45) Date of Patent: May 24, 2011

(54) OPTIMIZING XSLT BASED ON INPUT XML DOCUMENT STRUCTURE DESCRIPTION AND TRANSLATING XSLT INTO EQUIVALENT XQUERY EXPRESSIONS

(75) Inventors: Zhen Hua Liu, San Mateo, CA (US); Muralidhar Krishnaprasad, Fremont, CA (US); Anguel Novoselsky, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1250 days.

(21) Appl. No.: 11/261,684

(22) Filed: Oct. 28, 2005

(65) Prior Publication Data

US 2006/0242563 A1    Oct. 26, 2006

Related U.S. Application Data

(60) Provisional application No. 60/673,997, filed on Apr. 22, 2005.

(51) Int. Cl.
*G06F 17/27* (2006.01)

(52) U.S. Cl. ......... 715/234; 715/236; 715/237; 715/239

(58) Field of Classification Search .................. None
See application file for complete search history.

(56) References Cited

U.S. PATENT DOCUMENTS

| 5,404,513 | A | 4/1995 | Powers et al. |
| 5,680,614 | A | 10/1997 | Bakuya et al. |
| 5,878,415 | A | 3/1999 | Olds |
| 5,974,407 | A | 10/1999 | Sacks |
| 5,987,506 | A | 11/1999 | Carter et al. |
| 5,999,941 | A | 12/1999 | Andersen |
| 6,012,067 | A | 1/2000 | Sarkar |
| 6,038,563 | A | 3/2000 | Bapat et al. |

(Continued)

FOREIGN PATENT DOCUMENTS

EP    1 241 589 A2    9/2002

(Continued)

OTHER PUBLICATIONS

W3C, XSL Transformations (XSLT) Version 1.0 Reccomendation Nov. 16, 1999, Ch 1, 5.8, 6, 7.1.2, 7.1.3, 7.3, 7.4, 7.2, 9.2, 5.6, 10, 11.4, 11.5.*

(Continued)

*Primary Examiner* — Laurie Ries
*Assistant Examiner* — Andrew R Dyer
(74) *Attorney, Agent, or Firm* — Hickman Palermo Truong & Becker LLP (57) ABSTRACT

Transformation of a set of XML documents via an XSLT stylesheet is made more efficient by rewriting the stylesheet at compile-time, based on the structural description of the set of XML documents, into an optimized stylesheet containing fewer dynamic template-matching calls than the original stylesheet. This rewritten stylesheet can be further rewritten into a set of XQuery expressions. At compile-time, the particular transformation templates that are appropriate for transforming the particular nodes contained in the set of XML documents are determined, and XSLT calls to the templates are converted to calls to corresponding XQuery user-defined functions. Determination of the appropriate transformation templates may be based on the structural description of the input set of XML documents, such as an XML Schema or Document Type Definition. The data from each template is translated into corresponding XQuery constructors, instructions from the template are translated into XQuery expressions, and the XQuery functions are inlined if possible.

50 Claims, 4 Drawing Sheets

U.S. PATENT DOCUMENTS

| | | | |
|---|---|---|---|
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,199,195 B1 | 3/2001 | Goodwin et al. | |
| 6,208,993 B1 | 3/2001 | Shadmon | |
| 6,236,988 B1 | 5/2001 | Aldred | |
| 6,240,407 B1 | 5/2001 | Chang et al. | |
| 6,253,195 B1 | 6/2001 | Hudis et al. | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,282,537 B1 | 8/2001 | Madnick et al. | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1 | 7/2002 | Sarkar | |
| 6,438,540 B2 | 8/2002 | Nasr et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,708,186 B1 | 3/2004 | Claborn et al. | |
| 6,725,212 B2 | 4/2004 | Couch et al. | |
| 6,772,350 B1 | 8/2004 | Belani et al. | |
| 6,785,673 B1* | 8/2004 | Fernandez et al. | 707/3 |
| 6,836,778 B2 | 12/2004 | Manikutty et al. | |
| 7,031,956 B1 | 4/2006 | Lee et al. | |
| 7,043,716 B2 | 5/2006 | Zimmer et al. | |
| 2001/0037345 A1 | 11/2001 | Kiernan et al. | |
| 2002/0015042 A1 | 2/2002 | Robotham et al. | |
| 2002/0038358 A1 | 3/2002 | Sweatt, III et al. | |
| 2002/0056025 A1 | 5/2002 | Qui et al. | |
| 2002/0073019 A1 | 6/2002 | Deaton | |
| 2002/0100027 A1 | 7/2002 | Binding et al. | |
| 2002/0116371 A1 | 8/2002 | Dodds et al. | |
| 2002/0116457 A1 | 8/2002 | Eshleman et al. | |
| 2002/0120685 A1 | 8/2002 | Srivastava et al. | |
| 2002/0124100 A1 | 9/2002 | Adams | |
| 2002/0133484 A1 | 9/2002 | Chau et al. | |
| 2002/0143727 A1* | 10/2002 | Hu et al. | 707/1 |
| 2002/0169788 A1 | 11/2002 | Lee et al. | |
| 2002/0184401 A1 | 12/2002 | Kadel, Jr. et al. | |
| 2002/0198874 A1 | 12/2002 | Nasr et al. | |
| 2003/0004937 A1 | 1/2003 | Salmenkaita et al. | |
| 2003/0009361 A1 | 1/2003 | Hancock et al. | |
| 2003/0014397 A1 | 1/2003 | Chau et al. | |
| 2003/0028561 A1 | 2/2003 | Gounares et al. | |
| 2003/0065659 A1 | 4/2003 | Agarwal et al. | |
| 2003/0093672 A1 | 5/2003 | Cichowlas | |
| 2003/0101194 A1 | 5/2003 | Rys et al. | |
| 2003/0140308 A1 | 7/2003 | Murthy et al. | |
| 2003/0158897 A1 | 8/2003 | Ben-Natan et al. | |
| 2003/0182624 A1 | 9/2003 | Large | |
| 2003/0200214 A1 | 10/2003 | Doole et al. | |
| 2004/0015783 A1* | 1/2004 | Lennon et al. | 715/523 |
| 2004/0043758 A1 | 3/2004 | Sorvari et al. | |
| 2004/0044965 A1 | 3/2004 | Toyama et al. | |
| 2004/0064466 A1 | 4/2004 | Manikutty et al. | |
| 2004/0088415 A1 | 5/2004 | Chandrasekar et al. | |
| 2004/0143581 A1 | 7/2004 | Bohannon et al. | |
| 2004/0148278 A1 | 7/2004 | Milo et al. | |
| 2004/0163041 A1* | 8/2004 | Engel | 715/509 |
| 2004/0167904 A1 | 8/2004 | Wen et al. | |
| 2004/0176958 A1 | 9/2004 | Salmenkaita et al. | |
| 2004/0193575 A1 | 9/2004 | Chen et al. | |
| 2004/0199905 A1* | 10/2004 | Fagin et al. | 717/136 |
| 2004/0216030 A1* | 10/2004 | Hellman et al. | 715/500 |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2004/0225865 A1* | 11/2004 | Cox et al. | 712/34 |
| 2004/0230667 A1 | 11/2004 | Wookey | |
| 2004/0260691 A1 | 12/2004 | Desai et al. | |
| 2004/0267760 A1 | 12/2004 | Brundage et al. | |
| 2005/0004892 A1 | 1/2005 | Brundage et al. | |
| 2005/0010896 A1* | 1/2005 | Meliksetian et al. | 717/106 |
| 2005/0022115 A1 | 1/2005 | Baumgartner et al. | |
| 2005/0055355 A1 | 3/2005 | Murthy et al. | |
| 2005/0160076 A1 | 7/2005 | Kanemasa | |
| 2005/0246159 A1 | 11/2005 | Perla et al. | |
| 2005/0262491 A1 | 11/2005 | Gu | |
| 2005/0273772 A1 | 12/2005 | Matsakis et al. | |
| 2005/0289125 A1 | 12/2005 | Liu et al. | |
| 2006/0010124 A1 | 1/2006 | Lucas et al. | |
| 2006/0085451 A1 | 4/2006 | Pal et al. | |
| 2007/0011167 A1 | 1/2007 | Krishnaprasad et al. | |

FOREIGN PATENT DOCUMENTS

| | | |
|---|---|---|
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |

OTHER PUBLICATIONS

Bezivin et al.; First Experiments with the ATL Model Transformation Language: Tranforming XSLT into XQuery; 2003; 2nd OOPSLA Workshop on Generative Techniques in the Context of Model Driven Architecture, pp. 1-18.*

XSL Transformations (XSLT); Nov. 16, 1999; W3C; pp. 1-57.*

Funderburk, J.E., et al., "XML Programming with SQL/XML and XQuery", XP-002353603, IBM Systems Journal vol. 41, No. 4, 2002, 24 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

Banerjee, Sandeepan et al."Oracle8*i*—The XML Enabled Data Management System"—Oracle Corporation, Mar. 2000, IEEE, pp. 561-568.

Banerjee, Sandeepan et al., XML Query (XQuery) Support in Oracle Database 10g Release 2, An Oracle White Paper, May 2005, 43 pages.

Bohannon, Philip et al., "From XML Schema to Relations: A Cost-Based Approach to XML Storage", IEEE—2002—Proceedings of the 18th International Conference on Data Engineering (ICDE '02), pp. 1-28.

Bourret, R. et al.: A generic Load/Extract Utility for Data Transfer Between XML Documents and Relational Databases, Jun. 8-9, 2000, IEEE computing SOC., pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Buxton, Stephen et al., "Querying XML," An Oracle White Paper, Dec. 2004, 29 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chen, Ruey-Shun et al., "Developing an XML framework for metadata system", Trinity College Dublin, Proc. of the 1st Inter. Sympo. on Information and Communication, pp. 267-272.

Cheng, Josephine, et al., "IBM DB2 XML Extender, An end-to-end solution for storing and retrieving XML documents," IEEE, ICDE '00 Conference, San Diego, Feb. 2000, 128 pages.

Dayen, I., "Storing XML in Relational Databases", XML.com XP-002275971(1998-2004) pp. 1-13.

Drake, Mark, "Managing Content with Oracle XML DB," An Oracle White Paper, Mar. 2005, 37 pages.

Drake, Mark, "Oracle Database 10G Release 2 XML DB," An Oracle White Paper, May 2005, 97 pages.

Drake, Mark, "Oracle Database 10G Release 2 XML DB & XML DB Repository," Oracle Data Sheet, May 2005, 6 pages.

Hierarchical Queries, XP-002295972, pp. 8-3 to 8-7.

Gennick, Jonathan, "XQuery Flowers," Oracle Magazine, Sep./Oct. 2005, 8 pages.

Grahn, Håkan, "Performance of Computer Systems," Karlskrona/Ronneby University, PowerPoint Presentation, 6 pages, 24 slides.

Jajodia, Sushil, et al., "Toward a Multilevel Secure Relational Data Model," ACM, 1991, 8393 SIGMOD Record, Jun. 20, 1991, No. 2, New York, US, XP 000364619, pp. 50-59.

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Khan, Andy, "Execution Trace," Located on the internet at http://pcl.cs.ucla.edu/projects/sesame/publications/sundeep_diss_html/node43.html#SECTION00422000000000000000, Downloaded on Jun. 5, 2006, 1 page.

Khan, Latifur et al., "A Performance Evaluation of Storing XML Data in Relational Database Management Systems"—ACM-2001 (pp. 31-38).

Kvita, Caroline, "XQuery: A New Way to Search," Oracle Magazine, Jan./Feb. 2005, 3 pages.

Krishnaprasad, Muralidhar, et al., "Query Rewrite for XML in Oracle XML DB," Oracle Corporation, Proceedings of the 30$^{th}$ VLDB Conference, Toronto Canada, 2004, 12 pages.

Lee, Geoff et al., Mastering XML DB Storage in Oracle Database 10g Release 2, An Oracle White Paper, Mar. 2005, 14 pages.

Lee, Geoff, "Mastering XML DB Repository in Oracle Database 10g Release 2," An Oracle White Paper, Mar. 2005, 14 pages.

Lee, Geoff, "Mastering XML DB Queries in Oracle Database 10g Release 2," An Oracle White Paper, Mar. 2005, 17 pages.

Lee, Geoff, "Oracle Database 10g Release 2 XML DB Technical Overview," An Oracle White Paper, May 2005, 27 pages.

Lee, Geoff, XQuery Support in Oracle Database 10g Release 2, Oracle operation, Power-Point Presentation, 59 pages.

Liu, Zhen Hua, "Native XQuery Processing in Oracle XMLDB," Oracle Corporation, 8 pages.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Melton, Jim, "ISO-ANSI Working Draft, XML-Related Specifications (SQL/XML)," WG3: DRS-020, H2-2002-365, Aug. 2002, 154 pages.

Murthy, Ravi, "XML Schema in Oracle XML DB," Proceedings of the 29$^{th}$ Conference, Berlin Germany, Nov. 2003, 10 pages.

Noser, Hansrudi, et al., "Dynamic 3D Visualization of Database-Defined Tree Structures on the WWW by Using Rewriting Systems," 2000, IEEE, XP-002262516, pp. 247-254.

Oracle Corporation, "Oracle9*i* XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.

Oracle Corporation, "Oracle9*i* XML Database Developer's Guide—Oracle XML DB," Release 2 (9.2), Mar. 2002, Part No. A96620-1, pp. 10-1-10-54.

Oracle Corporation, "XML Query (XQuery), Support in Oracle Database 10g Release 2," Oracle, Jul. 2005, 3 pages.

Oracle Corporation, "XML Transformation: CMSXDB," Oracle Tutorial, Apr. 28, 2004, 8 pages.

Peng, Feng et al., "XPath queries on streaming data", 2003, ACM Press, pp. 431-442.

Ramakrishnan, Ragu et al. "SRQL: Sorted Relational Query Language" IEEE Jul. 1-3, 1998, pp. 84-95.

Vion-Dury, Jean-Yves, "XPath on left and right sides of rules: toward compact XML tree rewriting through node patterns", 2003, ACM Press, pp. 19-25.

Vorthmann Scott, et al., "Beyond Schemas, Schema Adjuncts and the Outside World," Markup Languages, Online!, vol. 2, No. 3, Jun. 2000, pp. 1-8.

Votsch, Victor, et al., "Oracle XML DB: Uniting XML Content and Data," Seybold Consulting Group, Mar. 2002, 14 pages.

W3C, "XML Schema Part 1: Structures," W3C Recommendation, May 2, 2001, http://www.w3.org/TR/2001/REC-xmlschema-1-20010502/, pp. 1-203.

W3C, "XML Schema Part 2: Datatypes," W3C Recommendation, May 2, 2001, http://www.w3.org/TR/2001/REC-xmlschema-2-20010502/, pp. 1-146.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

Zemke, Fred, "XMLQuery," Change Proposal, ISO/IEC JTC1/SC32 WG3:SIA-nnn ANSI NCITS H2-2004-021r1, Mar. 14, 2004, 29 pages.

International Preliminary Examination Report, Application No. PCT/US03/35551, Oct. 8, 2004, pp. 1-7.

Written Opinion, Application No. PCT/US03/35551, Nov. 10, 2004, 6 pages.

Current claims in PCT/US03/35551, pp. 1-4.

International Preliminary Examination Report, Application No. PCT/US02/30783, Apr. 1, 2004, 14 pages.

Current claims in PCT/US02/30783, pp. 1-8.

Oracle Corporation, Oracle 9i XML Database Developer's Guide—Oracle XML DB, Release 2 (9.2) Mar. 2002, pp. 1-908.

Votsch et al., "Oracle XML DB: Uniting XML Content and Data", Seybold Consulting Group, 2002, 14 pages.

Krishnaprasad et al., Proceedings of the 30$^{th}$ VLDB Conference, Toronto Canada, 2004, 11 pages.

Du, F., "Moving from XML Documents to XML Databases", Thesis, University of British Columbia, Mar. 2004, 42 pages.

Melton, J., "SQLX Bringing XML and SQL Together", JISBD2001, Jornada de Ingeneria del Software y Bases de Datos, Almagro, Espana, 2001, 156 pages.

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

International Preliminary Examining Authority, "Written Opinion," PCT/US2005/021259, dated Oct. 13, 2006, 7 pages.

Current Claims, PCT/US2005/021259, 10 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

Choi, Byron et al., "The XQuey Formal Semantics: A Foundation for Implementation Optimization," May 31, 2002, IEEE XP-002353605, 15 pages.

Funderbunk, J. et al., "XML programming with SQL/XML and XQuery", *IBM Systems Journal*, XP-002295973 (2002), pp. 642-665.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the 27$^{th}$ Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Sushant, J. et al., "Translating XSLT Programs to Efficient SQL Queries", Int'l WWW Conf., Proceedings of the 11th Int'l Conf. on WWW, Session: Query Language for Semantic Web, Published 2002, pp. 616-626.

Fokoue, A. et al., "Compiling XSLT 2.0 into XQuery 1.0", Int'l WWW Conf., Proceedings of the 14th Int'l Conf. on WWW, Published: 2005, pp. 682-691.

WC3, "XML Schema Part 1: Structures, Second Edition", http://www.w3.org/TR/2004/REC-xmlschema-1-20041028/structures.htm#intro-purpose downloaded from the Internet Jul. 15, 2009 (210 pages).

Simeon, J. et al., "The Essence of XML", Annual Symposium on Principles of Programming Languages, Proceedings of the 30th ACM SIGPLAN-SIGACT Symposium on Principles of Programming Languages, Published: 2003; pp. 1-13.

Lee, D. et al., "CPI: Constraints-Preserving Inlining Algorithms for Mapping XML DTD to Relational Schema", Data & Knowledge Engineering, vol. 39, Issue 1, Published: Oct. 2001, pp. 3-25.

Shanmugasundaram, J. et al., "Relational Databases for Querying XML Documents: Limitations and Opportunities", Proceedings of the 25th VLDB Conf., Published: 1999, pp. 302-314.

Liu, J. et al., "Query Translation from XSLT to SQL", Database Engineering and Applications Symposium 2003, Published: Jul. 16-18, 2003, pp. 87-96.

Jones, N.D. et al., "Partial Evaluation and Automatic Program Generation", Prentice Hall Int'l, Jun. 1993 (425 pages).

U.S. Appl. No. 11/471,743, filed Jun. 20, 2006, Notice of Allowance, mailed May 19, 2010.

* cited by examiner

--PRIOR ART--

OPTIMIZING XSLT BASED ON INPUT XML DOCUMENT STRUCTURE DESCRIPTION AND TRANSLATING XSLT INTO EQUIVALENT XQUERY EXPRESSIONS

CROSS-REFERENCE TO RELATED APPLICATIONS

This application is related to and claims the benefit of priority to U.S. Provisional Patent Application No. 60/673,997 filed on Apr. 22, 2005, entitled "IDEA AND TECHNIQUE OF REWRITING XSLT INTO XQUERY"; the entire contents of which is incorporated by this reference for all purposes as if fully disclosed herein.

This application is related to U.S. patent application Ser. No. 10/428,878 filed on May 1, 2003, entitled "Techniques For Rewriting XML Queries Directed to Relational Database Constructs"; and is related to U.S. patent application Ser. No. 10/984,471 filed Nov. 8, 2004, entitled "Techniques For Partial Rewrite of XPATH Queries In A Relational Database"; and is related to U.S. patent application Ser. No. 10/948,523 filed Sep. 22, 2004, entitled "Efficient Evaluation of Queries Using Translation"; the entire contents of all of which are incorporated by this reference for all purposes as if fully disclosed herein. These three applications are referred to herein as the "Query Rewrite" references.

FIELD OF THE INVENTION

The present invention relates generally to data management and, more specifically, to optimizing and translating XSLT into equivalent XQuery expressions.

BACKGROUND

XML is a versatile markup language, capable of labeling the information content of diverse data sources including structured and semi-structured documents, relational databases, and object repositories. A query language that uses the structure of XML intelligently can express queries across all these kinds of data, whether physically stored in XML or viewed as XML via middleware. As increasing amounts of information are stored, exchanged, and presented using XML, the ability to intelligently query XML data sources becomes increasingly important. One of the great strengths of XML is its flexibility in representing many different kinds of information from diverse sources. To exploit this flexibility, an XML query language must provide features for retrieving and interpreting information from these diverse sources.
The XQuery Query Language The XQuery language is described in "XQuery 1.0: An XML Query Language, W3C Working Draft 4 Apr. 2005" available from the W3C organization; the entire contents of which are incorporated by this reference for all purposes as if fully disclosed herein. XQuery is designed to be a language in which queries are concise and easily understood. XQuery is also flexible enough to query a broad spectrum of XML information sources, including both databases and documents. XQuery operates on the abstract, logical structure (i.e., the data model) of an XML document, rather than its surface syntax. Note that an XQuery expression comprises one or more expressions (i.e., sub-expressions).
The XSLT Transformation Language The XSLT language is described in "XSL Transformations (XSLT) Version 1.0, W3C Recommendation 16 Nov. 1999" available from the W3C organization; the entire contents of which are incorporated by this reference for all purposes as if fully disclosed herein. XSLT is a language for transforming XML documents into other XML documents or other markup language documents (e.g., HTML). XSLT is designed for use as part of XSL, which is a stylesheet language for XML. In addition to XSLT, XSL includes an XML vocabulary for specifying formatting. XSL specifies the styling of an XML document by using XSLT to describe how the document is transformed into another document that uses the formatting vocabulary. XSLT is also designed for use independently of XSL.

A transformation in the XSLT language is expressed as a well-formed XML document. A transformation expressed in XSLT describes rules for transforming a source tree into a result tree. The transformation is achieved by associating patterns with templates. A pattern is matched against nodes in the source tree. A template is instantiated to create part of the result tree. The result tree is separate from the source tree and the structure of the result tree can be completely different from the structure of the source tree. In constructing the result tree, nodes from the source tree can be filtered and reordered, and arbitrary structure can be added.

A transformation expressed in XSLT is called a stylesheet because, in the case when XSLT is transforming into the XSL formatting vocabulary, the transformation functions as a stylesheet. A stylesheet contains a set of template rules. A template rule has two parts: (1) a pattern which is matched against nodes in the source tree, and (2) a template which can be instantiated to form part of the result tree. This allows a stylesheet to be applicable to a wide class of documents that have similar source tree structures.

A template is instantiated for a particular source node to create part of the result tree. A template can contain elements that specify literal result element structure. A template can also contain elements from the XSLT namespace that are instructions for creating result tree fragments. When a template is instantiated, each instruction is executed and replaced by the result tree fragment that it creates. Instructions can select and process descendant source nodes. Processing a descendant node creates a result tree fragment by finding the applicable template rule and instantiating its template. Note that nodes are only processed when they have been selected by the execution of an instruction. The result tree is constructed by finding the template rule for the root node and instantiating its template.

XSLT and XQuery share the same XPath as a common core. Additionally, both languages have constructs to construct new nodes in an XML result tree, provide constructs for iterations, conditional testing, allow read-only variables usage (functional language without assignment semantics), support user defined functions, etc. A significant difference between the two languages is that XSLT has the powerful template rule matching driven style of execution, which XQuery does not have. In this sense, XSLT is even more declarative than XQuery as it does not require programmers to state procedurally how each template is applied.

However, the declarative nature of XSLT stylesheets is at the expense of performing what is often a complex template matching routine. This runtime matching routine is required because of the lack of advance knowledge about the input content and, therefore, which particular templates are most appropriate and should be invoked to transform the input content. Furthermore, sequential languages such as XQuery are more computationally efficient than template-matching driven languages such as XSLT because a processor executing a sequence of instructions in the sequential language simply knows what to do, without having to perform rule-based matching to determine what to do.

Figure 1:
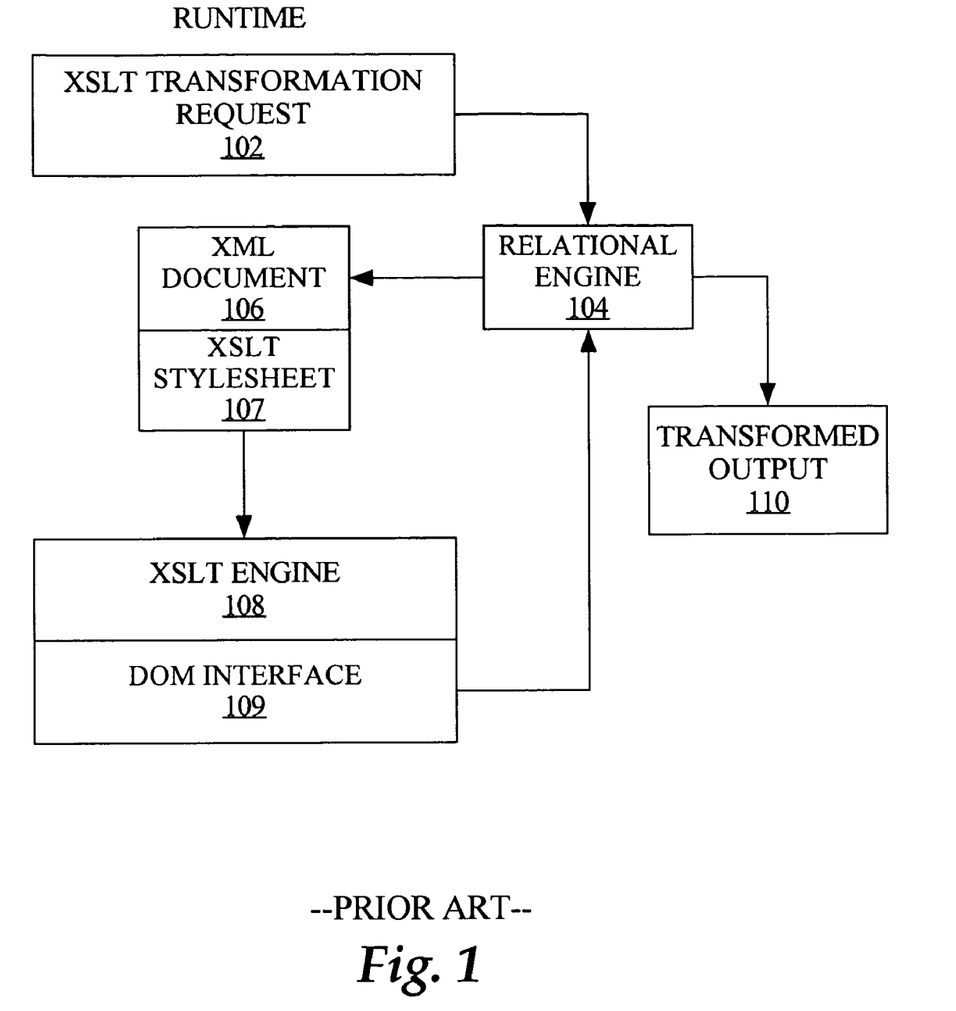
FIG. 1 is a block diagram that illustrates a functional evaluation process flow for an XSLT transformation request.

One approach to transforming XML data based on an XSLT stylesheet, in the context of a relational database system, is referred to as functional evaluation. FIG. 1 is a block diagram that illustrates a functional evaluation process flow for an XSLT transformation request. Functional evaluation of an XSLT transformation request 102, in view of the XML input data and the particular XSLT stylesheet specified in the request 102 (e.g., an xmltransform( ) operator), generally involves the following: (a) constructing a structured XML document 106 from the XML data storage layer (e.g., if the XML data is shredded and stored in relational and/or object-relational tables of a relational database management system (RDBMS), then the actual construction of the XML document from relational or object-relational tables is required); (b) materializing the XML document into a DOM-like (document object model) structure, which is a tree-like structure used to represent the structure of the data; (c) calling into an XSLT engine 108 to apply the XSLT stylesheet 107 and its associated set of transformation templates to the input DOM, which includes performing the template matching routine; (d) generating a new DOM that represents the transformed XML data; and (e) re-mapping the transformed data into new layouts or table structures (i.e., table translation), via a DOM interface 109 and RDBMS engine 104. This conceptual functional evaluation of XMLTransform( ) with XSLT style sheet is expensive because XML data needs to be constructed from various pieces from different storage tables and then passed to a standalone XSLT engine. Based on the foregoing, there is a need for a better process for transforming, via XSLT stylesheets, XML data stored in a relational database system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS
OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

According to one aspect of the invention, transformation of a set of XML documents via an XSLT stylesheet is made more efficient by processing the XSLT transformation request, at compile-time, into an optimized XSLT stylesheet using the structural descriptions of the set of XML documents. Structural descriptions of the set of XML documents can be, for example, an XML Schema or a DTD (Document Type Definition) to which this set of XML documents conforms. In the optimized XSLT stylesheet, the template instantiation is more deterministic than the original XSLT stylesheet. Thus, evaluation of the optimized XSLT stylesheet requires fewer, or no, dynamic XSLT template matching processes than with evaluation of the original XSLT stylesheet. For example, the 'xsl: apply-templates' instructions in the original XSLT stylesheet are replaced by 'xsl:call-template' instructions.

According to one aspect of the invention, transformation of one or more XML documents via an XSLT stylesheet is made more efficient by processing the XSLT transformation request, at compile-time, into corresponding one or more XQuery expressions. Consequently, further existing optimization techniques can be applied to the XQuery expression, such as rewriting the XQuery expression into a corresponding SQL or SQL/XML statement for efficient execution by a relational database query engine, against underlying relational and/or object-relational constructs. Furthermore, when stored XML data has an XPath index and/or a value index, then XQuery expressions can be executed more efficiently by leveraging these indexes. The consequence is that only the portions of the XML data that are needed for the XSLT result construction are extracted, and the extraction process itself can be done very quickly via various indexing mechanisms. This is significantly faster than formulating the entire XML document from various pieces and passing that into the XSLT engine. Thus, the XSLT-to-XQuery translation process leverages the vast XML processing capabilities of the relational database management system.

For example, when a set of XQuery expressions is processed by a database server, depending on the nature of the input XML (e.g., if the input XML is from schema based XMLType table/view, SQL/XML view over relational tables/views, XMLIndex indexed XMLType value), the query performance can be orders of magnitude better than processing the corresponding XSLT statement via an XSLT engine. Therefore, applying the described techniques to an XML-Transform( ) function, for example, the performance of the XMLTransform( ) function can be orders of magnitude better.

One key to translating from XSLT to XQuery is how to effectively and efficiently translate XSLT template processing into XQuery constructs. According to one embodiment, at XSLT statement compile-time, the particular transformation templates that are appropriate for transforming the particular elements contained in the XML document (also referred to as source tree nodes or, simply, nodes) are determined, and XSLT calls to the templates are converted to calls to corresponding XQuery language functions. Furthermore, data from the template is translated into corresponding XQuery constructors, and instructions from the template are translated into XQuery expressions.

According to one embodiment, the appropriate templates are determined at compile time based on the structure of a set of XML documents, by generating a corresponding sample document and submitting the sample document to an XSLT engine for tracing execution paths based on the particular XSLT stylesheet and the sample document.

Operating Environment

The techniques described herein are described in the general context of a database system. A database system typically comprises one or more clients that are communicatively coupled to a server that is connected to a shared database. "Server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One database language supported by many database servers is known as the Structured Query Language (SQL).

A relational database system may be extended to provide native support for storage, management, and query of particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner.

XSLT to XQuery Translation Process Flow

Figure 2:
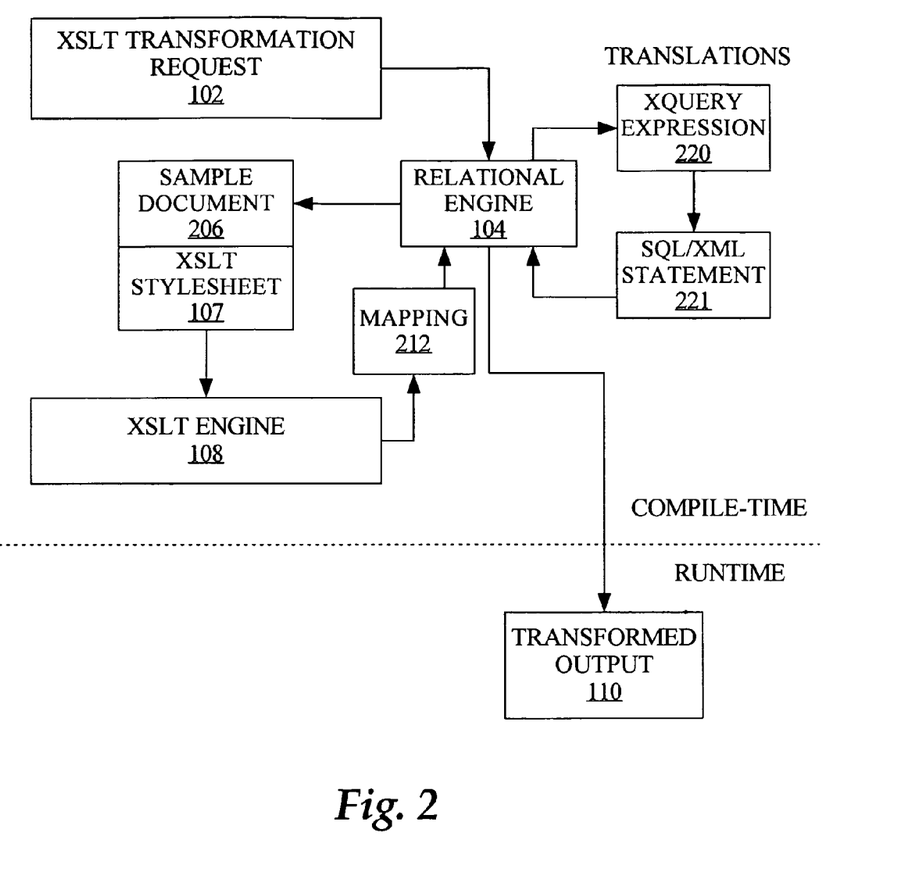
FIG. 2 is a block diagram that illustrates an XSLT transformation process flow, according to an embodiment of the invention.

FIG. 2 is a block diagram that illustrates an XSLT transformation process flow, according to an embodiment of the invention. One notable difference between the process flow of FIG. 1 and the process flow of FIG. 2 is that, rather than performing the entire transformation at transformation statement runtime (FIG. 1), most of the process described herein is performed at transformation statement compile time.

An XSLT transformation request 102 is received at a database server relational engine 104. XSLT transformation requests include references to a set of XML document instances (which are typically stored in XMLType tables or XMLType table columns, or SQL/XML view columns generated from relational or object relational data) and an XSLT stylesheet 107. According to one embodiment, based on the input XMLType metadata, a corresponding sample document 206 is constructed or accessed if already constructed. The sample document 206 represents all possible data structures with which the corresponding set of XML document instances may be associated, and is based on the structure of a class of documents of which the XML document is part. For non-limiting examples, the sample document 206 may be constructed based on (a) an XML schema or DTD information to which the corresponding set of XML document instances conforms, (b) a relational or object relational schema from which the set of XML document instances is constructed, and (c) the data guide for the set of XML document instances, which is based on analysis of the set of XML document instances and represents all possible data structures with which any corresponding XML document instance may be associated.

One approach to representing a class of XML documents is described in U.S. patent application Ser. No. 11/044,472 entitled "Technique of Using XMLType Tree as the Type Infrastructure for XML", the content of which is incorporated by this reference in its entirety for all purposes as if fully disclosed herein. This approach utilizes a universal format for a type representation of type structure of XMLType instances that are generated in various ways from various data sources, SQL expressions and queries, and storage mechanisms. This format or type representation is referred to herein as an XMLType type tree. Therefore, sample document 206 may be constructed based on an XMLType type tree associated with a corresponding input XML document.

An XSLT engine 108 uses the sample document 206 and XSLT stylesheet 107 to trace possible execution paths of the XSLT transformation for documents of the class corresponding to the sample document 206. Note that the sample document 206 that corresponds to a given input set of XML document instances that is the subject of the XSLT transformation request 102 (i.e., the document being transformed) may have already been constructed, at compile time, in response to a prior XSLT transformation request that included the same or a different input XML document from the same class of documents. Similarly, the execution path trace process performed by XSLT engine 108 may also have been previously performed at compile time in response to a prior XSLT transformation request that included the same or a different input XML document from the same class of documents.

The execution path trace process, for a set of documents, results in a mapping 212 of (a) XML nodes that may be contained in an XML document of the set, to (b) respective corresponding transformation templates, which are referenced in the input XSLT stylesheet 107. The execution path trace process effectively performs, at XSLT request compile time, the rule-based pattern matching and template selection process that is required by an XSLT transformation, i.e., for transforming a source tree into a result tree. Therefore, when a corresponding XML document needs to be transformed via the XSLT stylesheet, i.e., at XSLT transformation runtime, the transformation templates and the order of instantiation of these templates, for that document have already been identified via the trace process.

Relational engine 104 takes the set of input XML document instances stored in the database and uses the corresponding mapping 212 to translate the original XSLT stylesheet 107 of the transformation request 102 into a corresponding XQuery expression 220, where the mapping is used to translate template calls to XQuery user-defined function calls. Translation of the XSLT transformation request 102 into a corresponding XQuery expression 220 is described in greater detail herein. Using other independent techniques beyond the scope of this description, XQuery expression 220 can then be further translated into an SQL or SQL/XML statement 221, for efficient execution by relational engine 104 against the underlying relational or object relational tables used for the storage of the actual data or index on the input XML document instances in the database. This is because XML data or index stored in relational and object-relational constructs provides an efficient extraction of the individual pieces of XML data than constructing XML data in DOM form. In summary, the runtime functional evaluation flow depicted in FIG. 1, with which an XML document is formulated, a corresponding DOM constructed, etc., is replaced with runtime evaluation of a SQL or SQL/XML statement that simply accesses the XML data directly from the underlying relational/object-relational storage table(s).

XSLT To XQuery Translation

Figure 3:
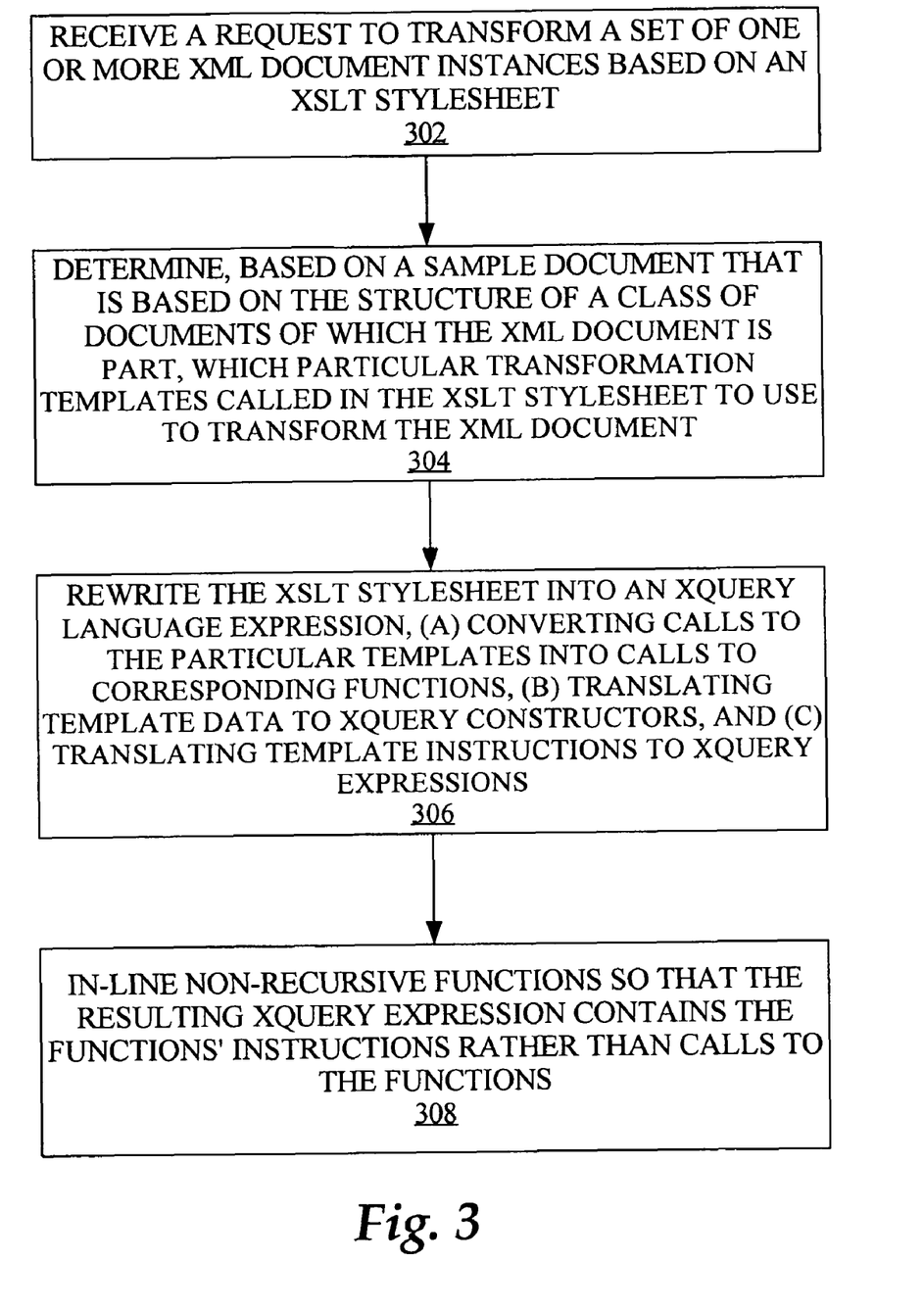
FIG. 3 is a flow diagram that illustrates a method for managing XSLT transformation requests, according to an embodiment of the invention.

FIG. 3 is a flow diagram that illustrates a method for managing XSLT transformation requests, according to an embodiment of the invention. More specifically, the technique illustrated in FIG. 3 can be used to optimize XSLT transformation queries on XML data stored in a relational database. The process illustrated in FIG. 3 is implemented for automated performance by a conventional computing system, such as computer system 400 of FIG. 4.

At block 302, a request to transform a set of XML document instances stored in the database, based on an XSLT stylesheet, is received. For example, a database statement that contains an XMLTransform( ) operator is received at a database server, where the operator includes a reference to an XMLType column (e.g., XMLType data stored in a relational database) and an XSLT stylesheet as input to the operator.

The following is an example of a SQL statement that calls an XMLTransform( ) operator to transform each XML document instance stored in the table 'poem.doc' column into an HTML document. In this example, 'poem' is a table with an XMLType column named 'doc'. Each row of 'poem' table stores an instance of the 'poem' XML document.

```
SELECT XMLTransform(poem.doc,
'<?xml version="1.0"?>
<xsl:stylesheet version = "1.0"
        xmlns:xsl="http://www.w3.org/1999/XSL/Transform"
        xmlns:oracle="http://www.oracle.com/XSL/Transform/java">
<xsl:template match="poem">
<html>
<head>
<title><xsl:value-of select="title"/></title>
</head>
<body>
<xsl:apply-templates select="title"/>
<xsl:apply-templates select="author"/>
</body>
</html>
</xsl:template>
<xsl:template match="title">
<div align="center"><h1><xsl:value-of select="."/></h1></div>
</xsl:template>
<xsl:template match="author">
<div align="center"><h1><xsl:value-of select="."/></h1></div>
</xsl:template>
</xsl:stylesheet>'
FROM poem_table.
```

Conventionally, the XSLT stylesheet includes calls to one or more transformation templates, where each template specifies how to transform data associated with a corresponding XML element (i.e., node), and rule-based pattern matching criteria to match particular XML elements with particular corresponding transformation templates.

The following XSLT stylesheet is used as the parameter to the XMLTransform( ) operator in the SQL SELECT statement of the foregoing example:

```
<?xml version="1.0"?>
<xsl:stylesheet version = '1.1'
        xmlns:xsl='http://www.w3.org/1999/XSL/Transform'
        xmlns:oracle='http://www.oracle.com/XSL/Transform/java'>
```

```
<xsl:template match="poem">
<html>
<head>
<title><xsl:value-of select="title"/></title>
</head>
<body>
<xsl:apply-templates select="title"/>
<xsl:apply-templates select="author"/>
</body>
</html>
</xsl:template>
<xsl:template match="title">
<div align="center"><h1><xsl:value-of select="."/></h1></div>
</xsl:template>
<xsl:template match="author">
<div align="center"><h1><xsl:value-of select="."/></h1></div>
</xsl:template>
</xsl:stylesheet>
``` which, given an input row of 'poem' table containing the XML document 'poem.xml' with the following content:

```
<poem>
    <author>Robert</author>
    <date>1912</date>
    <title>Song</title>
</poem>
``` generates the following output XML (HTML) for that input row of the 'poem' table.

```
<html>
    <head>
        <title>Song</title>
    </head>
    <body>
        <div align="center"><h1>Song</h1></div>
        </div><div align="center"><h1>Robert</h1></div>
    </body>
</html>.
```

At block 304, a sample XML document, which captures all the possible structures of the corresponding set of XML document instances (e.g., stored in the 'poem.doc' column) is constructed and passed into the XSLT engine 108 (FIG. 2), together with the XSLT stylesheet. At block 304, the XSLT engine 108 determines the set of transformation templates that are used to transform the sample XML document, and the execution orders of these templates are identified, in a procedural manner. According to one embodiment, the mapping 212 (FIG. 2) of (a) XML nodes that may be contained in an XML document of the set, to (b) respective corresponding transformation templates, which are referenced in the input XSLT stylesheet 107 (FIG. 2), is used to select the appropriate template(s) for use in transforming the input set of XML document instances stored in the table.

At block 306, the XSLT stylesheet is translated into an XQuery language expression. According to one embodiment, rewriting the XSLT stylesheet into an XQuery expression includes converting each template into an XQuery user-defined function. According to one embodiment, for each template selected for use in transforming the XML document instances, the XSLT instructions in the template call are translated into corresponding XQuery expressions, and the output XML data in the template is translated into a corresponding XQuery direct constructor, as described in greater detail hereafter. The order of a series of XSLT template instantiations is converted into a sequence of XQuery user defined function calls.

According to one embodiment, at optional block 308, the non-recursive XQuery user-defined functions are "in-lined" so that the resultant XQuery expression is simplified, that is, the expression actually contains the body of the function rather than the call of the function. An XQuery compiler can perform this in-lining process. Alternatively, the XSLT to XQuery translation process can in-line non-recursive XSLT template calls so that all non-recursive XQuery user-defined function calls are not generated from XSLT to XQuery translation.

The following is the rewritten SQL/XML statement generated by blocks 306 and 308, where the XMLTransform( ) operator with the XSLT stylesheet is replaced by an XMLQuery( ) operator with an XQuery expression, from the above example:

```
SELECT XMLQuery(
  'declare namespace oracle =
  "http://www.oracle.com/XSL/Transform/java";
  declare variable $var000 := .;
  (: builtin template :)
  (
  let $var002 := $var000/poem
  return
    (: <xsl:template match="poem"> :)
    <html>
     <head>
      <title>{fn:string($var002/title)}</title>
     </head>
     <body>
     {
      for $var005 in $var002/title
      return
        (: <xsl:template match="title"> :)
        <div align="center">
         <h1>{fn:string($var005)}</h1>
        </div>,
      for $var005 in $var002/author
      return
        (: <xsl:template match="author"> :)
        <div align="center">
         <h1>{fn:string($var005)}</h1>
        </div>
     }
     </body>
    </html>
  ) '
FROM poem.
```

Translating XSLT Template Calls to XQuery Function Calls
Explicit Language Translation Translating XSLT transformation templates that are to be applied to the XML document resolves into selection of an XQuery user defined function to invoke. According to one embodiment, referred to herein as "explicit language translation," each XSLT "xslt:apply-templates" instruction is translated into multiple XQuery conditional expressions. Each condition in the XQuery conditional expression is translated from the template matching pattern, with consideration of the template mode, priority, etc. Since each template rule matching expression is essentially an XPath expression, the translation of template matching patterns into respective conditional expressions is straightforward.

Each action in the XQuery conditional expression is the invocation of a specific user defined function corresponding to the specific XSLT template. This approach can be quite efficient if the XSLT compiler/optimizer can translate many "xslt:apply-templates" instruction into "xslt:call-templates" instruction by utilizing knowledge of the structure of the input XML documents (such as XML Schema information) during compile time. That is, it is desirable to translate template matching into direct template invocation as much as possible during XSLT compile time by taking advantage of knowing the structure or schema information of the input XML documents.

Implicit Language Translation

According to one embodiment, referred to herein as "implicit language translation," an XQuery engine of the database server selects the template function to invoke. That is, the XQuery engine is enhanced with an XSLT style function invocation mode, which selects the function to invoke based on the set of criteria defined by the XSLT stylesheet. This can be quite efficient provided that the underlying XQuery engine can be enhanced with an efficient and scalable template selection algorithm. If the XQuery engine is enhanced to allow a user defined function to return a function reference, (e.g., in functional programming language, that means returning a lambda function; in conventional C/C++ programming language, that means returning a functional pointer), then even the template selection process can be translated as a user defined external function, which calls into the XQuery engine and returns a reference to the user defined function (for the corresponding template) to be invoked.

Hybrid Translation

According to one embodiment, referred to herein as "hybrid translation," explicit language translation is performed for cases where the exact template is known (or a small number of templates) based on the input XML structural information (such as XML Schema) and the matching pattern itself. Otherwise, implicit language translation is performed for arbitrary template pattern matching cases.

Regardless of which of the foregoing template selection processes is used, template rule matching in XSLT is conceptually equivalent to the following XQuery expression with "xslt_xquery_eng:find_template( )" and "xslt_xquery_eng: invoke template( )" as the underlying XQuery engine implemented system function.

```
declare function local: template_for_nodes($x as node( )*) as node( )*
{
  if (xslt_xquery_eng:find_template($x))
    xslt_xquery_eng:invoke_template($x)
  else
    typeswitch ($x)
      case $x as element( )
        return for $d in $x/*
          return local: template_for_nodes($d)
      case $x as document-node( )
        return for $d in $x/*
          return local: template_for_nodes($d)
      case $x as attribute( )
        return fn:string($x)
      case $x as text( )
        return fn:string($x)
      case $x as processing-instruction( )
        return ( )
      case $x as comment( )
        return ( )
};
local: template_for_nodes(.)
```

Translating XSLT Template Instructions to XQuery Expressions

In the following description, XSLT instructions are grouped and for each XSLT instruction in the group, the corresponding XQuery expression is described.

(I) XSLT template Definition/Invocation Instruction to XQuery User Defined Function/Invocation Expression (A) xsl:template This is translated into an XQuery function. The text in the template body is translated into an XQuery constructor. The instruction in the template body is translated into an XQuery expression.

For example, the following XSLT template instructions,

```
<xsl:template match="title">
<div align="center"><h1><xsl:value-of select="."/></h1></div>
</xsl:template>
``` can be translated into the following XQuery function:

```
declare function local:title_template($x as node( )*) as node( )*
{
<div align="center"><h1>{fn:data($x/.)}</h1></div>
}
```

The match pattern, name, priority, and mode can be used to convert "xslt:apply-templates" into "xslt:call-template" during translation-time, based on information about the input XML. Otherwise, the XQuery engine can determine which template to invoke, as described above.

(B) xsl:param (local variable to a template)

This is translated from the XSLT template into local variables in the XQuery function.

(C) xsl:call-template

This is translated into the direct invocation of the XQuery function corresponding to the named template specified by the "xsl:call-template" command.

(D) xsl:apply-templates

This translation is discussed above in reference to translating XSLT template calls to XQuery function calls.

(E) xsl:with-param

This is translated as parameter passing for the call of the XQuery user defined function.

(II) XSLT XML Result Constructor Instruction Translation to XQuery Constructor Expression All plain text in XSLT is translated into an XQuery constructor.

(A) xsl:element

This is translated into an XQuery computed element constructor.

(B) xsl:attribute and xsl:attribute-set

This is translated into an XQuery attribute constructor.

(C) xsl:processing-instruction

This is translated into an XQuery processing instruction constructor.

(D) xsl:comment

This is translated into an XQuery comment constructor.

(E) xsl:text

This is translated into an Xquery text constructor.

(F) xsl:value-of

This is translated into an Xquery fn:string( ) function.

(III) XSLT Conditional Instruction Translation to XQuery Conditional Expression (A) xsl:choose, xsl:otherwise, xsl:if, xsl:when This is translated into an Xquery 'if' conditional expression.

(IV) XSLT Loop Iteration Instruction Translation into XQuery Iteration Expression Expression (A) xsl:for-each, with optional xsl:sort This is translated into an Xquery FOWR expression (where the general structure of an XQuery is described by the acronym FLOWR, which stands for FOR, LET, ORDER BY, WHERE and RETURN. The xsl:sort( ) is translated into XQuery 'order by' clause. The 'number' and 'text' datatype for xsl:sort( ) can be translated into XQuery order by using xs:double( ) and xs:string( ) functions, respectively.

(V) XSLT Variable Instruction Translation into XQuery Let Expression Expression (A) xsl:variable This is translated into an Xquery Let expression, where an XSLT variable reference is translated into its corresponding XQuery variable reference.

(VI) XSLT Global Variable Instruction Translation into XQuery Global Variable Expression (A) xsl:param (top level)

This is translated into an XQuery global variable declaration.

(VII) XSLT Error Reporting Instruction Translation into XQuery fn:error( ) Expression (A) xsl:message This is translated into an Xquery fn:error( ).

For certain XSLT instructions that do not have a corresponding direct XQuery expression construct, such instructions are translated into XQuery functions that are implemented natively by the underlying XQuery processors.

EXAMPLE

As an example, an XSLT transformation request based on the foregoing XSLT stylesheet, and according to the techniques described herein, may be translated into the following XQuery Expression:

```
declare function local:title_template($x as node( )*) as item( )*
{
<div align="center"><h1>{fn:string($x/.)}</h1></div>
};
declare function local:author_template($x as node( )*) as item( )*
{
<div align="center"><h1>{fn:string($x/.)}</h1></div>
};
declare function local:poem_template($x as node( )*) as item( )*
{
<html><head><title>{fn:string($x/title)}</title></head><body>
  {local:title_template($x/title)} {local:author_template($x/author)}
</body></html>
};
local:poem_template(fn:doc('poem.xml'))
```

After applying either XSLT template in-lining or XQuery function in-lining, the resulting XQuery expression can be as simple as the following. Note there are no user-defined XQuery function calls corresponding to the original XSLT template instantiation.

```
Let $doc = fn:doc('poem.xml')
  return
```

```
<html>
    <head><title>fn:string($doc/title)</title></head>
    <body>
        <div algin="center"><h1>fn:string($doc/title)</h1></div>
        <div algin="center"><h1>fn:string($doc/author)</h1></div>
    </body>
</html>.
```

Transforming an XML Document with Embedded XSLT

The techniques described herein can also effectively translate an XML document embedded with an XSLT stylesheet into XQuery expressions. For example, consider the following XML document with XSLT stylesheet embedded:

```
<chapter xsl:version="2.0"
    xmlns:xsl="http://www.w3.org/1999/XSL/Transform">
    <title>doc1.xml</title>
    <p>First paragraph</p>
    <xsl:copy-of select="document('doc2.xml')/doc/p[@id='p2']"/>
    <p>Last paragraph</p>
</chapter>
```

The foregoing document can be translated into the following equivalent XQuery expression:

```
<chapter>
    <title>doc1.xml</title>
    <p>First paragraph</p>
    {document('doc2.xml')/doc/p[@id='p2']}
    <p>Last paragraph</p>
</chapter>
```

The forgoing XQuery can be executed efficiently by the database system that executes XQuery natively.

Rewriting XQuery Expressions for Accessing Relational Database Constructs

The techniques described herein effectively translate a dynamic XSLT transformation process (i.e., dynamic pattern matching template selection) into a static process by mapping XSLT templates to corresponding user defined functions, mapping XSLT template calls to function calls, and mapping XSLT transformation instructions to corresponding XQuery constructors. In addition to translating an XSLT transformation request into a corresponding XQuery expression, according to one embodiment, the XQuery expression is further rewritten to a form that is directed to the underlying relational database construct (e.g., directed to the storage table column or the pieces of the XML data). Execution of such a query may utilize efficient access paths for evaluation of the underlying tables, which is performed in accordance with regular query optimization (e.g., by a traditional database query optimizer). Some techniques for rewriting XML queries directed to relational database constructs are described in the Query Rewrite references. The techniques disclosed in the Query Rewrite references may be used in conjunction with the embodiments described herein, but use of the Query Rewrite techniques with the embodiments described herein is not required.

The following database statement is an example of applying the Query Rewrite techniques to the foregoing XQuery SQL statement, which results in the following simplified SQL/XML query for runtime execution. Note that the final SQL query has no XSLT or XQuery invocation. Rather, the query simply accesses the underlying storage column for the 'title' and 'author' of the XML data and generates the HTML tag using XMLElement( ) element constructor.

```
SELECT xmlelement("html",
    xmlelement("head",
        xmlelement("title", poem.doc.title)),
    xmlelement("body",
        xmlelement("div", xmlattribute('center' as "align"),
            xmlelement("h1", poem.doc.title)),
        xmlelement("div", xmlattribute('center' as "align"),
            xmlelement("h1", poem.doc.author))))
FROM poem;
```

On the other hand, if the 'poem.doc' is stored with a path index to access title and author data, then the above SQL statement is effectively executed with path index lookup, as follows:

```
SELECT xmlelement("html",
    xmlelement("head",
        xmlelement("title", extractValue(poem.doc.'/poem/title')),
    xmlelement("body",
        xmlelement("div", xmlattribute('center' as "align"),
            xmlelement("h1", extractValue(poem.doc, '/poem/title'))),
        xmlelement("div", xmlattribute('center' as "align"),
            xmlelement("h1", extractValue(poem.doc.'/poem/author')))))
FROM poem.
```

Hardware Overview

Figure 4:
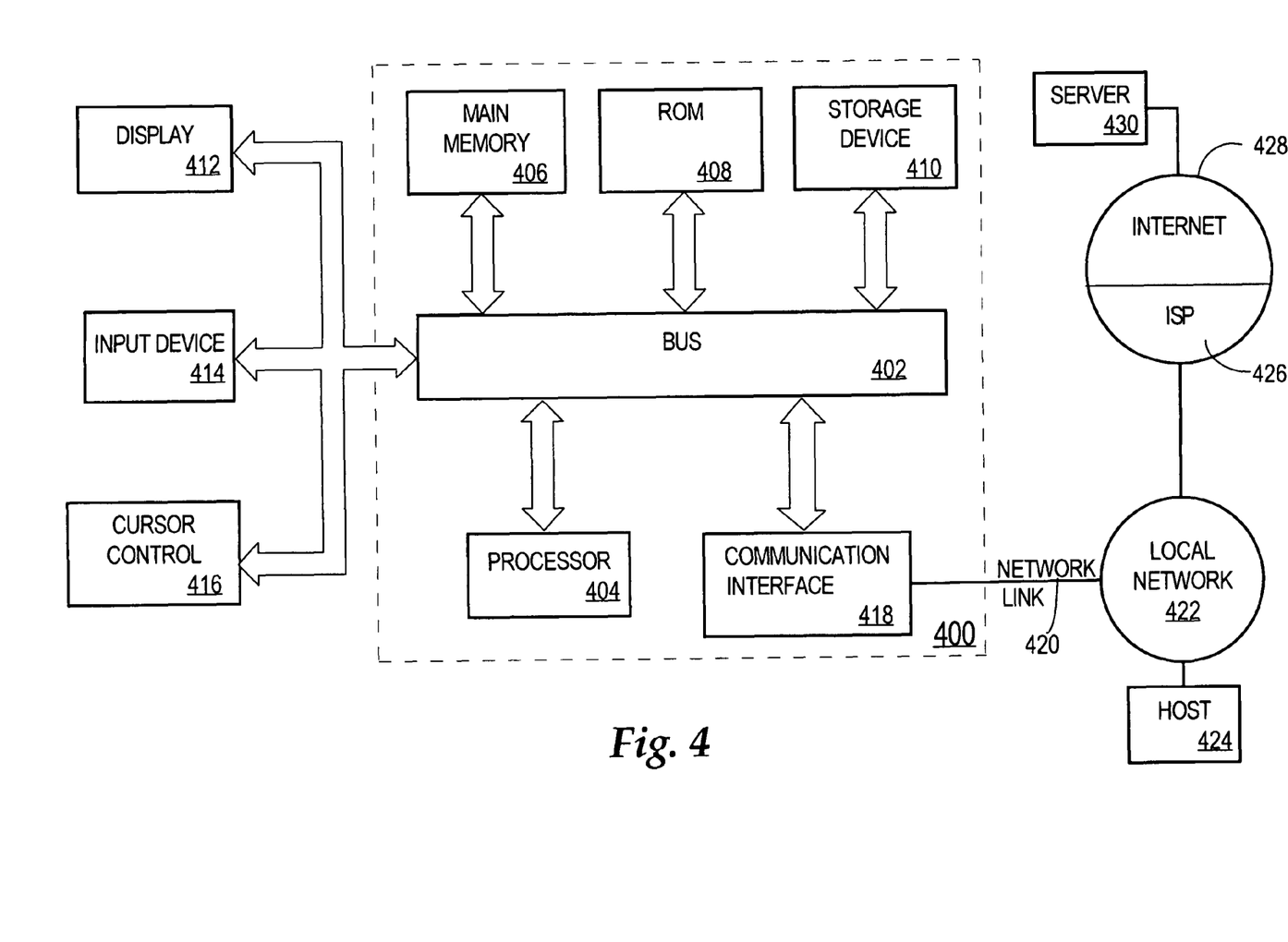
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled-with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving a request to transform a set of one or more XML documents based at least in part on an XSLT stylesheet that includes calls to one or more transformation templates, wherein each transformation template specifies how to transform one or more nodes, wherein the one or more nodes include a first node and a descendant node of the first node, wherein the calls to the one or more transformation templates, if evaluated based on the XSLT stylesheet, would use an XSLT template matching process to associate the descendant node in the set of one or more XML documents with a transformation template;

determining, based at least in part on a structural description that constrains the set of one or more XML documents to a hierarchy of nodes that may be present in the set of one or more XML documents, which one or more transformation templates to use to transform the set of one or more XML documents, wherein the hierarchy of nodes includes the first node and the descendant node; and converting the calls in the XSLT stylesheet that would use the one or more transformation templates into calls to one or more XQuery user-defined functions, and including the calls to the one or more XQuery user-defined functions in a set of one or more XQuery language expressions;

wherein the calls to the one or more XQuery user-defined functions do not use the XSLT template matching process;

wherein the method is performed by one or more computing devices.

2. The method of claim 1, further comprising:
   translating the one or more XQuery language expressions into one or more corresponding SQL database statements; and
   submitting the one or more database statements to a database server for execution of the one or more database statements.

3. The method of claim 1, wherein the determining further comprises:
   based at least in part on the structural description that constrains the set of one or more XML documents to the hierarchy of nodes that may be present in the set of one or more XML documents, constructing a corresponding sample document that represents the structure of the set of one or more XML documents;
   submitting the sample document to an XSLT engine for transformation based at least in part on the XSLT stylesheet and for tracing execution paths associated with the transformation, wherein the execution paths indicate, for particular nodes contained in the sample document, which particular transformation template to use to transform the corresponding particular node.

4. The method of claim 3, wherein the converting further comprises:
   accessing a mapping, resulting from the sample document execution path tracing, that identifies a particular template used to transform a particular node in the sample document and defines a corresponding XQuery user-defined function that corresponds to the particular template;
   wherein selecting the particular template is based at least in part on template matching criteria defined in the XSLT stylesheet.

5. The method of claim 3, wherein constructing the sample document includes constructing the sample document using an XML schema to which the set of one or more XML documents conforms.

6. The method of claim 3, wherein constructing the sample document includes constructing the sample document using a Document Type Definition to which the set of one or more XML documents conforms.

7. The method of claim 3, wherein constructing the sample document includes constructing the sample document using a relational or object-relational schema based at least in part on which the set of one or more XML documents is constructed.

8. The method of claim 3, wherein constructing the sample document includes constructing the sample document using a data guide to which the set of one or more XML documents structurally conforms.

9. The method of claim 3, wherein determining which particular one or more transformation templates to use to transform the set of one or more XML documents includes:
   accessing a mapping resulting from the sample document execution path tracing, wherein the mapping indicates, for each node that may be contained in the XML document, which particular template to use to transform the corresponding node.

10. The method of claim 1, wherein translating the XSLT stylesheet into the set of one or more XQuery language expressions includes:
    for each of the one or more templates to use to transform the XML document, translating data from the template to one or more XQuery constructors; and
    translating instructions from the template to one or more XQuery expressions.

11. The method of claim 1, wherein translating the XSLT stylesheet into the set of one or more XQuery language expressions includes:
    translating an "xsl:apply-templates" instruction into a set of XQuery conditional expressions to call an XQuery user-defined function, wherein the set of XQuery conditional expressions are based at least in part on a template matching pattern for a corresponding template in the XSLT stylesheet, and wherein the XQuery user-defined function is based at least in part on the body of the template.

12. The method of claim 11, wherein translating the "xsl:apply-templates" instruction into the set of XQuery conditional expressions includes:
    including, in each XQuery conditional expression, a template matching pattern from the XSLT stylesheet.

13. The method of claim 11, wherein translating the "xsl:apply-templates" instruction into a-the set of XQuery conditional expressions includes:
    including, in each XQuery conditional expression, calls to a corresponding XQuery user-defined function.

14. The method of claim 1, wherein translating the XSLT stylesheet into the set of one or more XQuery language expressions includes:
    translating an "xsl:call-template" instruction into an XQuery language expression that calls a corresponding XQuery user-defined function, wherein the corresponding XQuery user-defined function is based at least in part on the body of a corresponding template of the one or more templates.

15. The method of claim 1, wherein translating the XSLT stylesheet into the set of one or more XQuery language expressions includes:
    representing non-recursive template calls or corresponding non-recursive user-defined XQuery functions in-line in the one or more XQuery language expressions.

16. The method of claim 1, wherein translating the XSLT stylesheet into the set of one or more XQuery language expressions includes:
    translating an "xsl:element" instruction into an XQuery element constructor.

17. The method of claim 1, wherein translating the XSLT stylesheet into the set of one or more XQuery language expressions includes:
    translating "xsl:attribute" or "xsl:attribute-set" instructions into an XQuery attribute constructor.

18. The method of claim 1, wherein translating the XSLT stylesheet into the set of one or more XQuery language expressions includes:
    translating an "xsl:processing-instruction" instruction into an XQuery processing instruction constructor.

19. The method of claim 1, wherein translating the XSLT stylesheet into the set of one or more XQuery language expressions includes :
    translating an "xsl:comment" instruction into an XQuery comment constructor.

20. The method of claim 1, wherein translating the XSLT stylesheet into the set of one or more XQuery language expressions includes:
    translating an "xsl:text" instruction into an XQuery text constructor.

21. The method of claim 1, wherein translating the XSLT stylesheet into the set of one or more XQuery language expressions includes:
    translating "xsl:choose", "xsl:otherwise", or "xsl:when" instructions into an XQuery conditional expression.

22. The method of claim 1, wherein translating the XSLT stylesheet into the set of one or more XQuery language expressions includes:
　translating an "xsl:foreach" instruction into an XQuery FOWR expression.

23. The method of claim 1, wherein translating the XSLT stylesheet into the set of one or more XQuery language expressions includes:
　translating an "xsl:sort" instruction into an XQuery order by expression;
　translating a 'number' datatype for xsl:sort into an XQuery order by with xs:double( ) function; and
　translating a 'text' datatype for xsl:sort into an XQuery order by with xs:string( )function.

24. The method of claim 1, wherein translating the XSLT stylesheet into the set of one or more XQuery language expressions includes:
　translating an "xsl:variable" instruction to declare a global variable into an XQuery global variable declaration expression.

25. The method of claim 1, wherein translating the XSLT stylesheet into the set of one or more XQuery language expressions includes:
　translating an "xsl:variable" instruction to declare a local variable into an XQuery LET variable definition expression.

26. The method of claim 1, wherein translating the XSLT stylesheet into the set of one or more XQuery language expressions includes:
　translating an XSLT instruction that does not have a corresponding direct XQuery expression construct into an XQuery function that is implemented natively by a host XQuery processor.

27. The method of claim 1, wherein translating the XSLT stylesheet into the set of one or more XQuery language expressions includes:
　translating an XSLT stylesheet embedded in an XML document into an XQuery language expression by translating data from the XML document into one or more XQuery constructor expressions and translating the embedded XSLT stylesheet into a set of one or more XQuery language expressions.

28. The method of claim 1, wherein the XSLT stylesheet is a first XSLT stylesheet, further comprising:
　at request compile time, computing a rewritten XSLT stylesheet by rewriting the first XSLT stylesheet;
　wherein computing the rewritten XSLT stylesheet includes said step of determining, based at least in part on the structural description that constrains the set of one or more XML documents to the hierarchy of nodes that may be present in the set of one or more XML documents, which particular one or more transformation templates to use to transform the set of one or more XML documents; and wherein the rewritten XSLT stylesheet includes fewer dynamic template matching calls than the first XSLT stylesheet.

29. The method of claim 28, wherein structural description is an XML Schema to which the one or more XML documents structurally conform.

30. The method of claim 28, wherein the structural description is a Document Type Definition to which the set of one or more XML documents structurally conform.

31. The method of claim 28, wherein determining which one or more transformation templates to use to transform the set of one or more XML documents comprises:
　based at least in part on the structural description that constrains the set of one or more XML documents to the hierarchy of nodes that may be present in the set of one or more XML documents, constructing a corresponding sample document that represents possible structures of the XML documents in the set of one or more XML documents;
　submitting the sample document to an XSLT engine for transformation based at least in part on the XSLT stylesheet and for tracing execution paths associated with the transformation, wherein the execution paths indicate, for each node contained in the sample document, which particular transformation template to use to transform the corresponding node.

32. A non-transitory computer-readable storage medium storing instructions, which, when executed by one or more computing devices, cause the one or more computing devices to perform:
　receiving a request to transform a set of one or more XML documents based at least in part on an XSLT stylesheet that includes calls to one or more transformation templates, wherein each transformation template specifies how to transform one or more nodes, wherein the one or more nodes include a first node and a descendant node of the first node, wherein the calls to the one or more transformation templates, if evaluated based on the XSLT stylesheet, would use an XSLT template matching process to associate the descendant node in the set of one or more XML documents with a transformation template;
　determining, based at least in part on a structural description that constrains the set of one or more XML documents to a hierarchy of nodes that may be present in the set of one or more XML documents, which transformation templates to use to transform the set of one or more XML documents, wherein the hierarchy of nodes includes the first node and the descendant node; and
　converting the calls in the XSLT stylesheet that would use the one or more transformation templates into calls to one or more XQuery user-defined functions, and including the calls to the one or more XQuery user-defined functions in a set of one or more XQuery language expressions;
　wherein the calls to the one or more XQuery user-defined functions do not use the XSLT template matching process.

33. The non-transitory computer-readable storage medium of claim 32, wherein the determining further comprises:
　based at least in part on the structural description that constrains the set of one or more XML documents to the hierarchy of nodes that may be present in the set of one or more XML documents, constructing a corresponding sample document that represents the structure of the set of one or more XML documents;
　submitting the sample document to an XSLT engine for transformation based at least in part on the XSLT stylesheet and for tracing execution paths associated with the transformation, wherein the execution paths indicate, for particular nodes contained in the sample document, which particular transformation template to use to transform the corresponding particular node.

34. The non-transitory computer-readable storage medium of claim 32, wherein translating the XSLT stylesheet into the set of one or more XQuery language expressions includes:
　for each of the one or more templates to use to transform the XML document, translating data from the template to one or more XQuery constructors; and
　translating instructions from the template to one or more XQuery expressions.

35. The non-transitory computer-readable storage medium of claim 32, wherein the XSLT stylesheet is a first XSLT stylesheet, and wherein the instructions, when executed by one or more computing devices, cause the one or more computing devices to further perform:
  at request compile time, computing a rewritten XSLT stylesheet by rewriting the first XSLT stylesheet;
  wherein computing the rewritten XSLT stylesheet includes said step of determining, based at least in part on the structural description of nodes contained in the set of that constrains the set of one or more XML documents to the hierarchy of nodes that may be present in the set of one or more XML documents, which particular one or more transformation templates to use to transform the set of one or more XML documents; and wherein the rewritten XSLT stylesheet includes fewer dynamic template matching calls than the first XSLT stylesheet.

36. The non-transitory computer-readable storage medium of claim 34, wherein the structural description is an XML schema to which the one or more XML documents structurally conform.

37. The non-transitory computer-readable storage medium of claim 34, wherein the structural description is a Document Type Definition to which the one or more XML documents structurally conform.

38. The non-transitory computer-readable storage medium of claim 32, wherein the instructions, when executed by one or more computing devices, cause the one or more computing devices to further perform:
  translating the one or more XQuery language expressions into one or more corresponding SQL database statements; and
  submitting the one or more database statements to a database server for execution of the one or more database statements.

39. The non-transitory computer-readable storage medium of claim 32, wherein translating the XSLT stylesheet into the set of one or more XQuery language expressions includes:
  representing non-recursive template calls or corresponding non-recursive user-defined XQuery functions in-line with the one or more XQuery language expressions.

40. The non-transitory computer-readable storage medium of claim 32, wherein translating the XSLT stylesheet into the set of one or more XQuery language expressions includes:
  translating "xsl:choose", "xsl:otherwise", or "xsl:when" instructions into an XQuery conditional expression.

41. The non-transitory computer-readable storage medium of claim 32, wherein translating the XSLT stylesheet into the set of one or more XQuery language expressions includes:
  translating an "xsl:sort" instruction into an XQuery order by expression;
  translating a 'number' datatype for xsl:sort into an XQuery order by with xs:double() function; and p1 translating a 'text' datatype for xsl:sort into an XQuery order by with xs:string()function.

42. The non-transitory computer-readable storage medium of claim 32, wherein translating the XSLT stylesheet into the set of one or more XQuery language expressions includes:
  translating an XSLT instruction that does not have a corresponding direct XQuery expression construct into an XQuery function that is implemented natively by a host XQuery processor.

43. The non-transitory computer-readable storage medium of claim 32, wherein translating the XSLT stylesheet into the set of one or more XQuery language expressions includes:
  translating an XSLT stylesheet embedded in an XML document into an XQuery language expression by translating data from the XML document into one or more XQuery constructor expressions and translating the embedded XSLT stylesheet into a set of one or more XQuery language expressions.

44. The non-transitory computer-readable storage medium of claim 32, wherein the determining further comprises:
  based at least in part on the structural description that constrains the set of one or more XML documents to the hierarchy of nodes that may be present in the set of one or more XML documents, constructing a corresponding sample document that represents the structure of the set of one or more XML documents;
  submitting the sample document to an XSLT engine for transformation based at least in part on the XSLT stylesheet and for tracing execution paths associated with the transformation, wherein the execution paths indicate, for particular nodes contained in the sample document, which particular transformation template to use to transform the corresponding particular node.

45. The non-transitory computer-readable storage medium of claim 44, wherein the converting further comprises:
  accessing a mapping, resulting from the sample document execution path tracing, that identifies a particular template used to transform a particular node in the sample document and defines a corresponding XQuery user-defined function that corresponds to the particular template;
  wherein selecting the particular template is based at least in part on template matching criteria defined in the XSLT stylesheet.

46. The non-transitory computer-readable storage medium of claim 44, wherein constructing the sample document includes constructing the sample document using an XML schema to which the set of one or more XML documents conforms.

47. The non-transitory computer-readable storage medium of claim 44, wherein constructing the sample document includes constructing the sample document using a Document Type Definition to which the set of one or more XML documents conforms.

48. The non-transitory computer-readable storage medium of claim 44, wherein constructing the sample document includes constructing the sample document using a relational or object-relational schema based at least in part on which the set of one or more XML documents is constructed.

49. The non-transitory computer-readable storage medium of claim 44, wherein constructing the sample document includes constructing the sample document using a data guide to which the set of one or more XML documents structurally conforms.

50. The non-transitory computer-readable storage medium of claim 44, wherein determining which one or more transformation template to use to transform the set of one or more XML documents includes:
  accessing a mapping resulting from the sample document execution path tracing, wherein the mapping indicates, for each node that may be contained in the XML document, which particular template to use to transform the corresponding node.

* * * * *